S. S. CASKEY.
HIGH PRESSURE GATE VALVE.
APPLICATION FILED AUG. 23, 1909.

1,049,450.

Patented Jan. 7, 1913.

WITNESSES

INVENTOR
Samuel S. Caskey.
BY Diedersheim & Fairbanks
ATTORNEYS

UNITED STATES PATENT OFFICE.

SAMUEL S. CASKEY, OF PHILADELPHIA, PENNSYLVANIA, ASSIGNOR TO CASKEY VALVE COMPANY, OF PHILADELPHIA, PENNSYLVANIA, A CORPORATION OF NEW YORK.

HIGH-PRESSURE GATE-VALVE.

1,049,450.      Specification of Letters Patent.      Patented Jan. 7, 1913.

Application filed August 23, 1909. Serial No. 514,188.

*To all whom it may concern:*

Be it known that I, SAMUEL S. CASKEY, a citizen of the United States, residing in the city and county of Philadelphia, State of Pennsylvania, have invented a new and useful High-Pressure Gate-Valve, of which the following is a specification.

This invention relates to valve structures and more particularly to the type known as gate valves for use in connection with all types of high fluid pressures such as steam, air or water, and has for an object to prevent leakage of any part of the valve joints, connections or the like, to the exterior of the valve casing, which leakage of course, renders the valve inoperative to perform its function.

It is well known that in fluid work especially where high pressures are utilized to force the fluid from one point to another by various conduits, the parts especially in gate valves, are subjected to a large amount of wear and if not constantly examined, become less efficient and often inoperative through the pressure leaking to the atmosphere.

In my present invention I have devised a novel means of packing, a gate valve in coöperation with which I employ a sealing bushing including a novel packing device whereby escaping pressure from the valve conduit operates in conjunction with the packing means to increase the efficiency thereof and reduce the danger of leakage to a minimum.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 2:
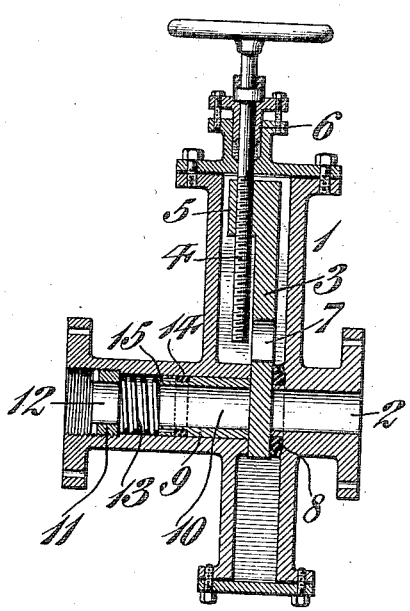
Figure 1:
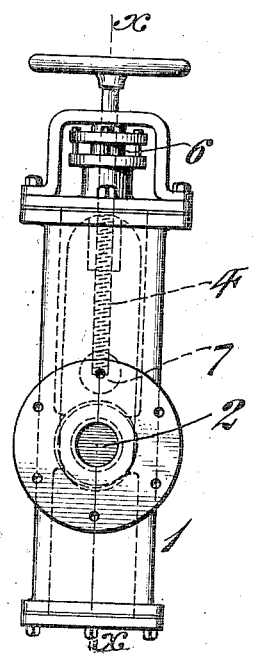

Figure 1 represents a side elevation of a valve embodying my invention. Fig. 2 represents a section on line $x-x$, Fig. 1.

Similar numerals of reference indicate corresponding parts in the figures.

Referring to the drawings: 1 designates the casing of a valve embodying my invention, the same being provided with a longitudinal bore 2 therethrough for the purpose of establishing communication from one side of the valve to the other as is well known, in the art, to which this invention applies.

3 designates a gate suitably mounted for sliding movement within the casing 1 it being understood that a portion of the casing is apertured to permit the said gate to pass transverse of the bore 2 and thereby at certain intervals close the same and prevent passage of fluid therethrough. For the purpose of operating the gate 3 in the present instance, I employ a rod 4 suitably threaded in an enlarged portion 5 of the gate 3, whereupon it will be clear that by rotating the said rod 4, the gate 3 will be moved in one direction or the other, as desired.

6 designates the usual stuffing box structure serving to prevent leakage around the stem of the rod 4 and it is not thought necessary to go into the details of construction of the same.

7 designates an opening through the gate 3 which is suitably located so as to aline with the bore 2 at certain times and thus permit a flow of fluid through the valve.

8 designates a packing suitably disposed adjacent the gate 3 and encircling the bore 2, whereby escape of pressure fluid is prevented on one side of the gate 3.

9 designates a sealing bushing slidingly mounted in the bore 2, in the present instance on the opposite side of the gate 3 from the packing 8 and normally abutting the face of the gate 3, the face of said bushing being preferably ground to form a tight joint with said gate. A suitable bore 10 is provided in the bushing in order to correspond to the bore 2 of the casing 1.

11 designates a retaining plug which is screwed or otherwise secured within the casing 1 at a suitable point with respect to the bushing 9 and the same is provided with a bore 12 for the obvious purpose of permitting fluid to pass through the bore 2. The sealing bushing, it will be noted, is mounted in the casing of the valve at the intake end, whereby the pressure fluid entering the casing will force the said bushing at all times against the gate 3, so that the pressure itself in the valve tends to form a tight joint between these parts, the advantages of which are evident. In some instances I may, if desired, employ a spring 13 situated between the sealing bushing 9 and the plug 11 in order to form a yielding pressure to assist in holding the said plug tightly against said gate 3.

14 designates a packing suitably mounted and encircling the bushing 9 with which packing a plurality of ports 15 are adapted to communicate in order to transmit fluid pressure back of the packing and further extend the same to make a pressure tight joint.

At suitable points in the casing, I provide a plurality of ports which communicate with the interior of the casing and with a suitable point back of the packing 8 in order that any pressure fluid which might leak into the interior of the casing will be directed back of the packing 8 to force the same against the gate.

It is well known that in gate valves, owing to the surface exposed to the action of the fluid pressure, that the parts readily become worn and permit escape of fluid very readily and it will be apparent that in the type of valve which I have devised, all portions subjected to pressure are efficiently packed and furthermore any leakage which may escape is used to maintain all packings absolutely tight over their respective joints and it is practically impossible for any of the said pressure fluid to reach the exterior of the casing.

It will now be apparent that I have devised a novel and useful construction which embodies the features of advantage enumerated as desirable in the statement of the invention and the above description, and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, a casing having a bore therethrough, a gate in said casing adapted to open and close said bore, a stationary packing upon one side of said gate and between the same and a wall of said casing and upon the opposite side of the valve from the fluid pressure entrance, a sealing bushing abutting said gate and forced thereagainst by the fluid pressure in the valve, packing between said bushing and casing, and means in the wall of said casing upon the opposite side of the valve from the fluid pressure entrance leading from the interior of the casing to a suitable point with respect to said stationary packing for directing the fluid pressure leaking between the gate and the bushing back of said stationary packing to force the same against said gate.

2. In a device of the character described, a casing having a bore therethrough, a gate in said casing adapted to open and close said bore, a stationary packing encircling the casing bore upon one side of the gate and between the same and a wall of said casing, a sealing bushing abutting said gate and forced thereagainst by the fluid pressure in the valve, a packing encircling said bushing, and means to admit fluid pressure back of said packing to compress the same over a joint, and said casing having means leading from the interior thereof for directing the pressure fluid, leaking between the gate and the bushing, back of said stationary packing to force the same against said gate.

3. In a device of the character described, a casing having a bore therethrough, a gate in said casing adapted to open and close said bore, a stationary packing upon one side of said gate between the same and a wall of the casing and upon the opposite side of the gate from the fluid pressure entrance, a sealing bushing abutting said gate and forced thereagainst by the fluid pressure in the valve, said casing having means leading from the interior thereof for directing the pressure fluid, leaking between the gate and the bushing, back of said stationary packing to force the same against said gate, and means for raising and lowering said gate.

SAMUEL S. CASKEY.

Witnesses:
JOSEPH H. BAILY,
ISAAC R. WITMER.